(12) United States Patent
Esteve Balducci et al.

(10) Patent No.: US 7,984,161 B2
(45) Date of Patent: Jul. 19, 2011

(54) OPTIMIZING MOBILE DEVICE SYNCHRONIZATION WITH MULTIPLE DATA SOURCES

(75) Inventors: Juan V. Esteve Balducci, Sammamish, WA (US); Shivakumar Seetharaman, Snoqualmie, WA (US); John A. Atwood, Duvall, WA (US); Gregory A. Bolles, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 36 days.

(21) Appl. No.: 12/485,506

(22) Filed: Jun. 16, 2009

(65) Prior Publication Data

US 2010/0318663 A1 Dec. 16, 2010

(51) Int. Cl.
G06F 15/16 (2006.01)
G06F 15/173 (2006.01)

(52) U.S. Cl. .................................. 709/227; 709/224

(58) Field of Classification Search .................. 709/227, 709/224; 455/412.1
See application file for complete search history.

(56) References Cited

U.S. PATENT DOCUMENTS

| | | | |
|---|---|---|---|
| 6,704,301 B2 | 3/2004 | Chari et al. | |
| 6,959,436 B2 | 10/2005 | Peng et al. | |
| 7,213,047 B2 | 5/2007 | Yeager | |
| 2005/0108687 A1 | 5/2005 | Mountain | |
| 2008/0086464 A1 | 4/2008 | Enga et al. | |

OTHER PUBLICATIONS

Say Ying Lim: "Mobile Query Processing Incorporating Multiple Non-collaborative Servers". Thesis, Monash University, Jul. 2007, pp. 1-300. http://beast.csse.monash.edu.au/~srini/theses/Say%20Lim%20thesis.pdf.

T. Imielinski et al.: "Data on Air: Organization and Access". IEEE Transactions on Knowledge and Data Engineering, vol. 9, No. 3, May/Jun. 1997. pp. 1-20. http://ieeexplore.ieee.org//stamp/stamp.jsp?tp=&arnumber=00599926.

Treocentral, Apr. 23, 2009, pp. 1-5 http://discussion.treocentral.com/palm-os-communication/39532-buscon-update-insists-push.html.

Tricia Duryee: Microsoft Confirms Mobile Cloud Services to be Called "My Phone". Feb. 6, 2009, p. 1 http://www.moconews.net/entry/419-microsoft-confirms-mobile-cloud-services-to-be-called-my-phone.

*Primary Examiner* — Ario Etienne
*Assistant Examiner* — Hee Soo Kim
(74) *Attorney, Agent, or Firm* — Merchant & Gould

(57) ABSTRACT

Embodiments are provided for synchronizing data retrieval with multiple data sources on a mobile computing device while maintaining a predetermined quality of service and optimizing resource usage. A connection is established between the mobile computing device and the multiple data sources for a first synchronization interval. A synchronization request is sent over the connection during the first interval. A response to the request including data is received from a data source during the first interval to synchronize the data. After the data is received, the connection to the data source is severed. The connection between the mobile computing device and the data source is then re-established for a second synchronization interval based on quality of service parameters associated with the data source and a pending connection status associated with one or more additional data sources. Another synchronization request is then sent by the mobile computing device over the re-established connection.

18 Claims, 8 Drawing Sheets

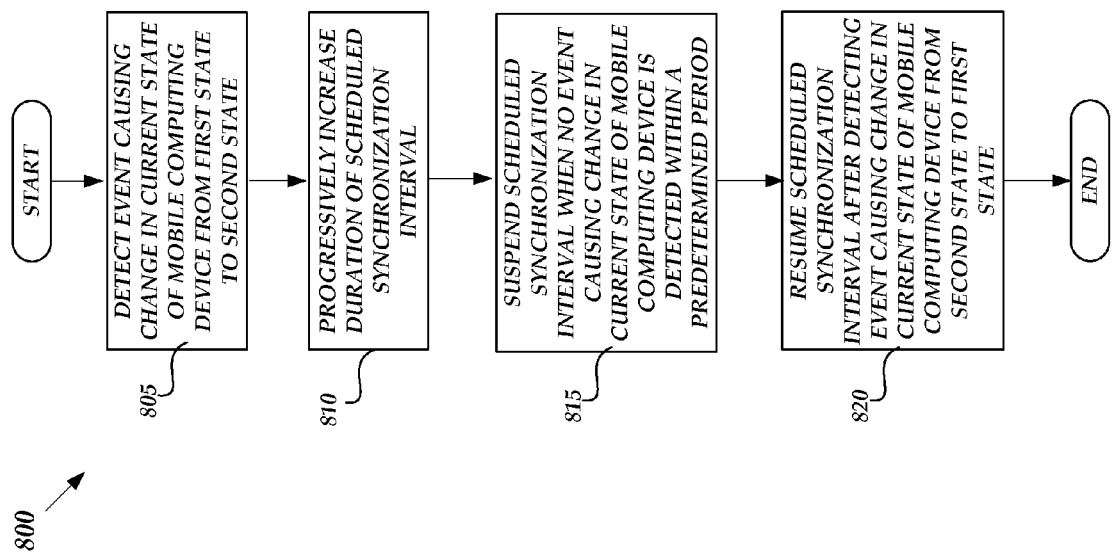

OPTIMIZING MOBILE DEVICE SYNCHRONIZATION WITH MULTIPLE DATA SOURCES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Mobile computing devices, such as smartphones, utilize a variety of technologies which allow for "push" data services for the synchronization of data (such as e-mail) from a server. According to various current "push" methods, data may be synchronized based on a predetermined subset of user actions (i.e., "scheduled sync") or based on a time out interval during which a notification is only transmitted to the mobile device if new data is received or the time out interval has elapsed (i.e., "hanging sync"). There are several drawbacks with current "push" methods, however when a mobile computing device needs to synchronize with multiple servers to retrieve data. For example, multiple disparate servers generating content at random intervals require the establishment of multiple time out intervals resulting in the excessive use of processing, bandwidth and battery power resources on the mobile computing device. Furthermore, current "push" methods fail to take into account quality of service requirements when synchronizing data thereby further wasting mobile computing device resources. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for synchronizing data retrieval with multiple data sources on a mobile computing device. A connection is established between the mobile computing device and the multiple data sources for a first synchronization interval. A synchronization request is sent over the connection during the first synchronization interval. A response to the synchronization request which includes data is received from a data source during the first synchronization interval to synchronize the data on the mobile computing device. After the data is received, the connection to the data source is severed. The connection between the mobile computing device and the data source is then re-established for a second synchronization interval based on quality of service parameters associated with the data source and a pending connection status associated with one or more additional data sources. Another synchronization request is then sent by the mobile computing device over the re-established connection.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 8 is a flow diagram illustrating a routine for synchronizing data retrieval with a plurality of data sources on a mobile computing device, in accordance with another embodiment.

DETAILED DESCRIPTION

Embodiments are provided for synchronizing data retrieval with multiple data sources on a mobile computing device. A connection is established between the mobile computing device and the multiple data sources for a first synchronization interval. A synchronization request is sent over the connection during the first synchronization interval. A response to the synchronization request which includes data is received from a data source during the first synchronization interval to synchronize the data on the mobile computing device. After the data is received, the connection to the data source is severed. The connection between the mobile computing device and the data source is then re-established for a second synchronization interval based on quality of service parameters associated with the data source and a pending connection status associated with one or more additional data sources. Another synchronization request is then sent by the mobile computing device over the re-established connection.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
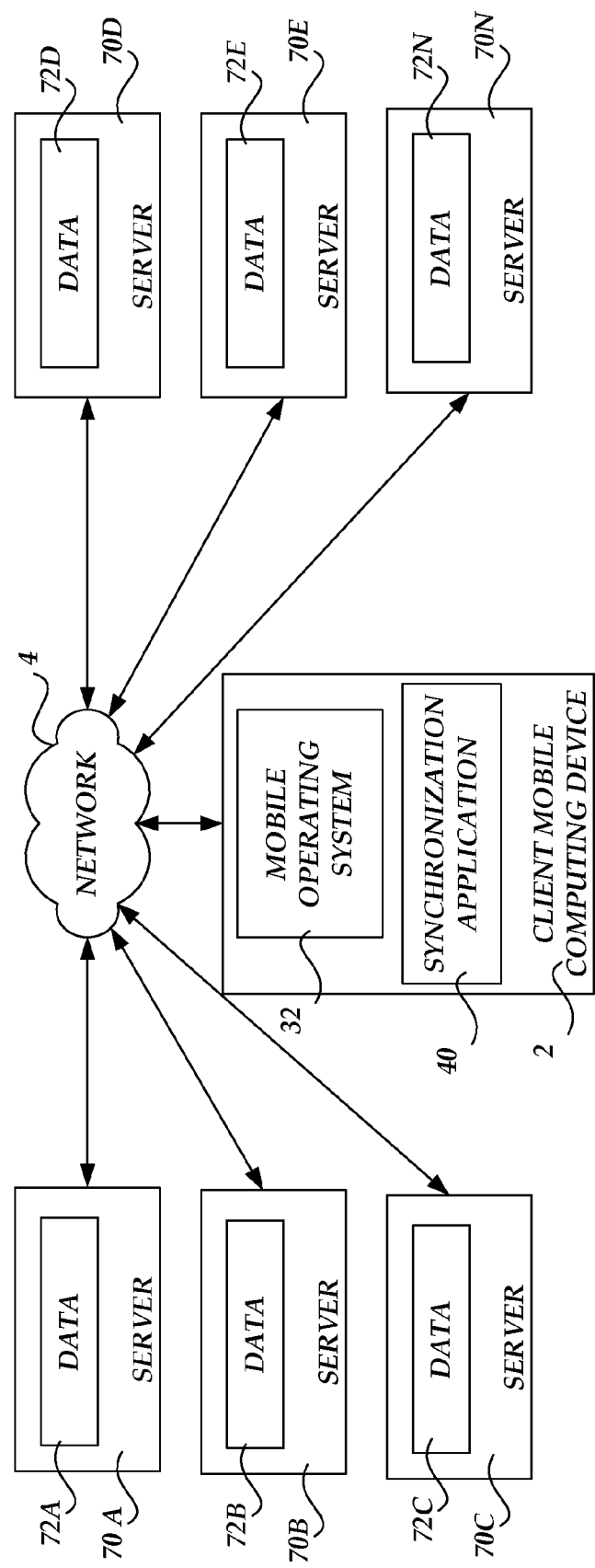
FIG. 1 is a block diagram illustrating a network architecture for synchronizing data retrieval with a plurality of data sources on a mobile computing device, in accordance with various embodiments.

Referring now to the drawings, in which like numerals represent like elements through the several figures, various aspects of the present invention will be described. FIG. 1 is a block diagram illustrating a network architecture for synchronizing data retrieval with a plurality of data sources on a mobile computing device, in accordance with various embodiments. The network architecture includes a client mobile computing device 2 in communication with network servers 70A-70N over a network 4. In accordance with various embodiments, the network 4 may comprise a local network or a wide area network (e.g., the Internet). It should be understood that the network 4 may represent a single network or, alternatively, multiple disparate networks associated with each of the network servers 70A-70N. It should be appreciated by those skilled in the art that, in accordance with an embodiment, the servers 70A-70N may represent services hosted on multiple servers or other complex computer systems.

The client mobile computing device 2 may include a mobile operating system 32 and a synchronization application 40. In accordance with various embodiments, the mobile operating system 32 may comprise the WINDOWS MOBILE software and the synchronization application 40 may comprise the OUTLOOK MOBILE e-mail, calendar, and contacts application. Both of the aforementioned software programs are manufactured by MICROSOFT CORPORATION of Redmond Wash. It should be appreciated that other operating systems and/or application programs from other manufacturers may be utilized in accordance with the various embodiments described herein.

In accordance with various embodiments, the client mobile computing device 2 may comprise a mobile or portable computer or other type of computer capable of executing one or more application programs including, but not limited to, a laptop computer and a "smartphone" (i.e., a mobile phone having computer functionality and/or which is capable of running operating system software to provide a standardized interface and platform for application developers). In accordance with various embodiments (which will be described in greater detail in the discussion of FIGS. 3-8), the mobile operating system 32 or the synchronization application 40 may be utilized to optimize the synchronization of data retrieved from the servers 70A-70N on the client mobile computing device 2.

The servers 70A-70N store data 72A-72N. In accordance with various embodiments, the servers 70A-70N may comprise multiple computing devices for receiving data requests from the client mobile computing device 2 and returning the data 72A-72N in response. The data 72A-72N may include, but is not limited to, electronic mail messages. In accordance with an embodiment, each of the servers 70A-70N may be configured to expose an interface that allows data requests from the client mobile computing device 2 to "hang" for a predetermined synchronization interval or until responses are sent from the servers 70A-70N to the client mobile computing device 2. It should be understood that a "hanging" data request is one in which a connection between the client mobile computing device 2 and a server (i.e., any one of the servers 70A-70N) is established, a data request is sent over the connection, and the connection is maintained for a synchronization interval (e.g., twenty minutes) until a response is sent to the client mobile computing device 2. Hanging data requests are described in greater detail in U.S. Pat. No. 7,437,169 entitled "System and Method for Optimizing Network Communication in Response to Network Conditions," the disclosure of which is incorporated herein, in its entirety, by reference.

It should further be understood that the interface exposed by the servers 70A-70N may be configured to hang with a granularity that is accurate and precise enough to allow multiple outstanding connections to return within a short time interval. As will be described in greater detail below, the mobile operating system 32 or the synchronization application 40 executing on the client mobile computing device 2 may make use of these precise hanging intervals such that they end simultaneously. It should be appreciated by those skilled in the art that communication between the client mobile computing device 2 and the servers 70A-70N may be facilitated by the use of a number of network protocols. For example, data communication may be facilitated by the use of the HyperText Transfer Protocol ("HTTP"). HTTP is well-known to those skilled in the art and therefore are not discussed further herein.

Exemplary Operating Environment

Figure 2:
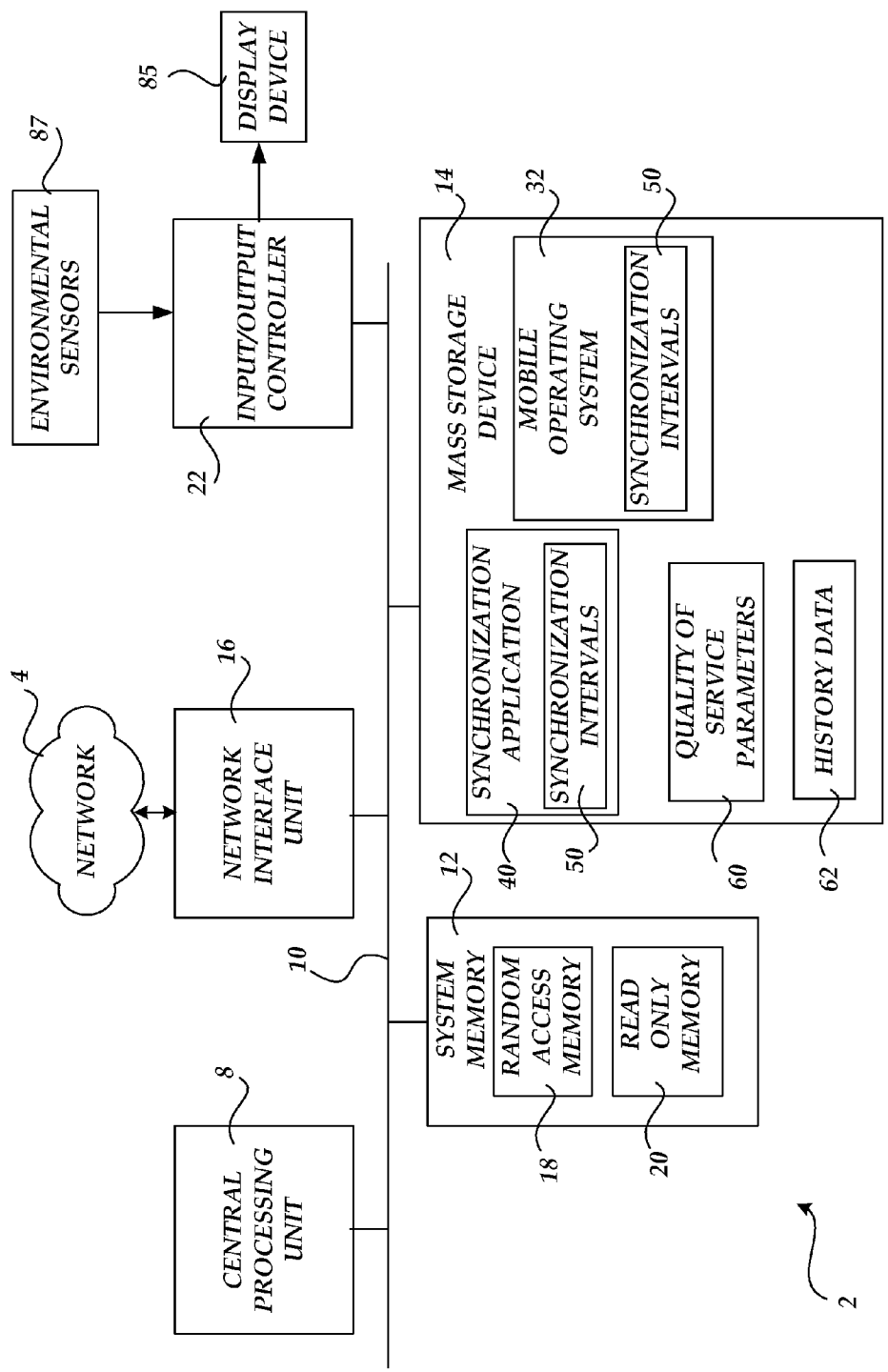
FIG. 2 is a block diagram illustrating a mobile computing device environment which may be utilized for synchronizing data retrieval with a plurality of data sources on a mobile computing device, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the client mobile computing device 2 which may include a mobile or portable computer or other type of computer capable of executing one or more application programs including, but not limited to, a laptop computer and a "smartphone" (i.e., a mobile phone having computer functionality and/or which is capable of running operating system software to provide a standardized interface and platform for application developers). The client mobile computing device 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The client mobile computing device 2 may further include a mass storage device 14 for storing the mobile operating system 32, the synchronization application 40, quality of service parameters ("QoS") 60, and history data 62. The mobile operating system 32 and the synchronization application 40 may also each contain synchronization intervals 50 which define a connection interval for receiving responses to pending data requests made to the servers 70A-70N. In accordance with various embodiments, the QoS parameters 60 may define a minimum synchronization interval for a connection between the client mobile computing device 2 and one or more of the servers 70A-70N. For example, in accordance with an embodiment, a QoS parameter 60 may not allow a synchronization interval (i.e., a hanging sync request) to be less than 1 minute. In accordance with another embodiment, a QoS parameter 60 may allow a synchronization interval (i.e., a hanging sync request) to be less than one minute. The history data 62 may represent an historical analysis of the length of previous connection intervals between the client computing device 2 and the servers 70A-70N. As will be described in greater detail below with respect to FIGS. 3-6, the QoS parameters 60 and the history data 62 (in addition to other time-based probabilities) may be utilized by the mobile operating system 32 or the synchronization application 40 to determine when to establish new connection intervals and how to align these connection intervals with pending connections on multiple servers (i.e., the servers 70A-70N). It should be understood that, in accordance with various embodiments, the QoS parameters 60 may also be defined in other ways. For example, a QoS parameter 60 may be defined in such a way which allows users to decide how "up to date" they want to be with respect to synchronization. A QoS parameter 60 may also define an amount of time that a user is willing to be out of sync with a given server or other data source.

The mass storage device 14 is connected to the CPU 8 through a mass storage controller (not shown) connected to the bus 10. The mass storage device 14 and its associated computer-readable media provide non-volatile storage for the client mobile computing device 2. Although the description of computer-readable media contained herein refers to a mass storage device, such as a hard disk or CD-ROM drive, it should be appreciated by those skilled in the art that computer-readable media can be any available media that can be accessed or utilized by the client mobile computing device 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the client mobile computing device 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the client mobile computing device 2 may operate in a networked environment using logical connections to remote computers through the network 4. The client mobile computing device 2 may connect to the network 4 through a network interface unit 16 connected to the bus 10. It should be appreciated that the network interface unit 16 may also be utilized to connect to other types of networks and remote computing systems. In accordance with various embodiments, the network interface unit 16 may include a wireless radio (not shown) for establishing and maintaining communication over the network 4. The client mobile computing device 2 may also include an input/output controller 22 for receiving and processing input from a number of input types, including environmental sensors 87 as well as a keyboard, mouse, pen, stylus, finger, and/or other means (not shown). In accordance with various embodiments, the environmental sensors may include a number of conventional components which may be incorporated into mobile computing devices including, but not limited to, a light sensor and a motion sensor (e.g., an accelerometer). Similarly, the input/output controller 22 may provide output to a display device 70 as well as a printer, or other type of output device (not shown). It should be understood that the client mobile computing device 2 may also include other conventional components (not shown) such as a power supply (e.g., a removable or non-removable battery) and a real-time clock.

Figure 3:
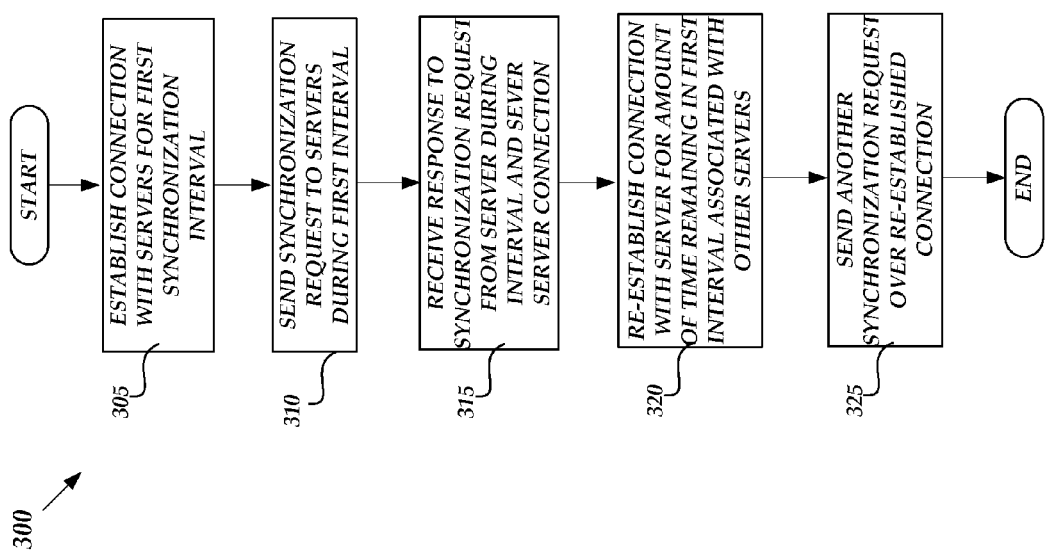
FIG. 3 is a flow diagram illustrating a routine for synchronizing data retrieval with a plurality of data sources on a mobile computing device, in accordance with an embodiment.

FIG. 3 is a flow diagram illustrating a routine 300 for synchronizing data retrieval with a plurality of data sources on a mobile computing device, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-8 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the mobile operating system 32 or the synchronization application 40 (hereinafter, the "synchronization application") executing on the client mobile computing device 2 establishes a connection with each of the servers 70A-70N for a first synchronization interval. In particular, the synchronization application may establish the aforementioned connections based on user-defined intervals for retrieving data from the servers 70A-70N.

From operation 305, the routine 300 continues to operation 310, where the synchronization application sends a synchronization request to the servers 70A-70N during the first synchronization interval. For example, the synchronization request may include a request for e-mail messages from multiple accounts being served by the servers 70A-70N.

From operation 310, the routine 300 continues to operation 315, wherein the synchronization application receives a response to the synchronization request from one of the servers 70A-70N during the first synchronization interval and then severs the connection with that server. For example, the synchronization application may receive e-mail messages from an account being served by the server 70A while the connections to the servers 70B-70N remain pending. It should be understood that if no responses are received from any of the pending connections with the servers 70A-70N during the first synchronization interval, then the synchronization application may sever the connections and reissue new requests over re-established connections for another synchronization interval.

From operation 315, the routine 300 continues to operation 320 where the synchronization application re-establishes the connection with the server from which a response was first received during the first synchronization interval. The new connection is re-established for the amount of time remaining in the first synchronization interval associated with the pending connections to the remaining servers. For example, if the synchronization application receives a response from the server 70A at the nineteen minute mark and the first synchronization interval is twenty minutes, then the new connection with the server 70A may be re-established for one minute (i.e., the amount of time remaining in the first synchronization interval).

From operation 320, the routine 300 continues to operation 325 where the synchronization application sends another synchronization request over the re-established connection for the new synchronization interval (i.e., an interval equal to the time remaining in the still pending first interval for the connections to the other servers). It should be understood that according to this embodiment, after the end of the new synchronization interval, all of the pending connections to the servers 70A-70N may potentially end at (or nearly at) the same time and thus the connections to the servers 70A-70N may be re-established at (or nearly at) the same time, thus conserving resources (i.e., the power required to cause the radio on the client mobile computing device 2 to send multiple requests to multiple servers at different times). From operation 325, the routine 300 then ends.

Figure 4:
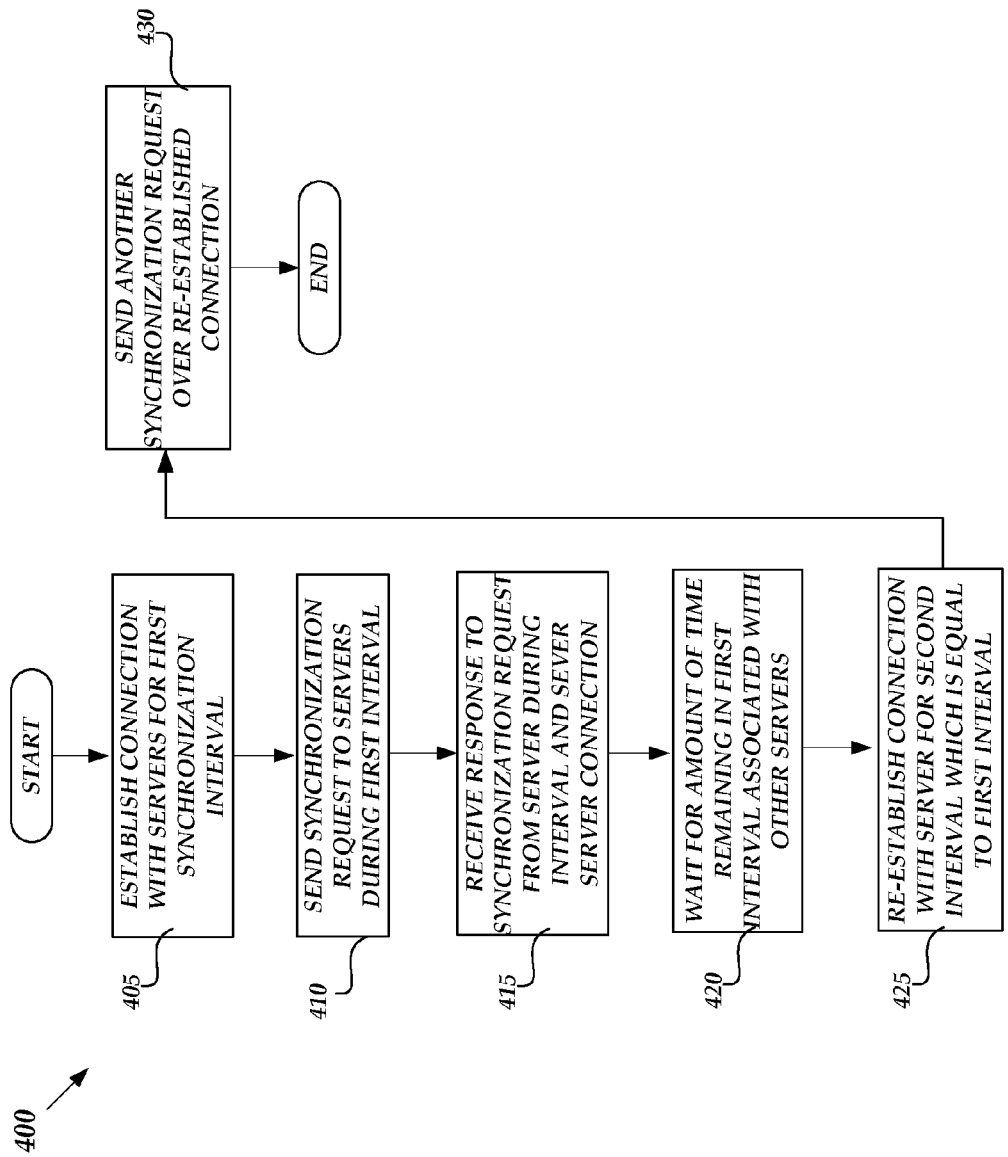
FIG. 4 is a flow diagram illustrating a routine for synchronizing data retrieval with a plurality of data sources on a mobile computing device, in accordance with another embodiment.

FIG. 4 is a flow diagram illustrating a routine 400 for synchronizing data retrieval with a plurality of data sources on a mobile computing device, in accordance with another embodiment. The routine 400 begins at operation 405, where the synchronization application executing on the client mobile computing device 2 establishes a connection with each of the servers 70A-70N for a first synchronization interval. In particular, the synchronization application may establish the aforementioned connections based on user-defined intervals for retrieving data from the servers 70A-70N.

From operation 405, the routine 400 continues to operation 410, where the synchronization application sends a synchronization request to the servers 70A-70N during the first interval. For example, the synchronization request may include a request for e-mail messages from multiple accounts being served by the servers 70A-70N.

From operation 410, the routine 400 continues to operation 415, wherein the synchronization application receives a response to the synchronization request from one of the servers 70A-70N during the first interval and then severs the connection with that server. For example, the synchronization application may receive e-mail messages from an account being served by the server 70A while the connections to the servers 70B-70N remain pending. It should be understood that if no responses are received from any of the pending connections with the servers 70A-70N during the first interval, then the synchronization application may sever the connections and reissue new requests over re-established connections for another synchronization interval.

From operation 415, the routine 400 continues to operation 420 where the synchronization application waits for the amount of time remaining in the first synchronization interval associated with the pending connections on the other servers. For example, if the synchronization application receives a response from the server 70A at the nineteen minute mark and the first synchronization interval is twenty minutes, then the synchronization application will wait until the expiration of the first synchronization interval before re-establishing the connection with the server 70A.

From operation 420, the routine 400 continues to operation 425 where the synchronization application re-establishes the connection with the server from which a response was first received during the first synchronization interval. The new connection is re-established for a second or new synchronization interval which is equal to the first synchronization interval (e.g., twenty minutes).

From operation 425, the routine 400 continues to operation 430 where the synchronization application sends another synchronization request over the re-established connection. It should be understood that according to this embodiment, connections to the servers 70A-70N may be re-established at (or nearly at) the same time, thus conserving resources (i.e., the power required to cause the radio on the client mobile computing device 2 to send multiple requests to multiple servers at different times). From operation 430, the routine 400 then ends.

Figure 5:
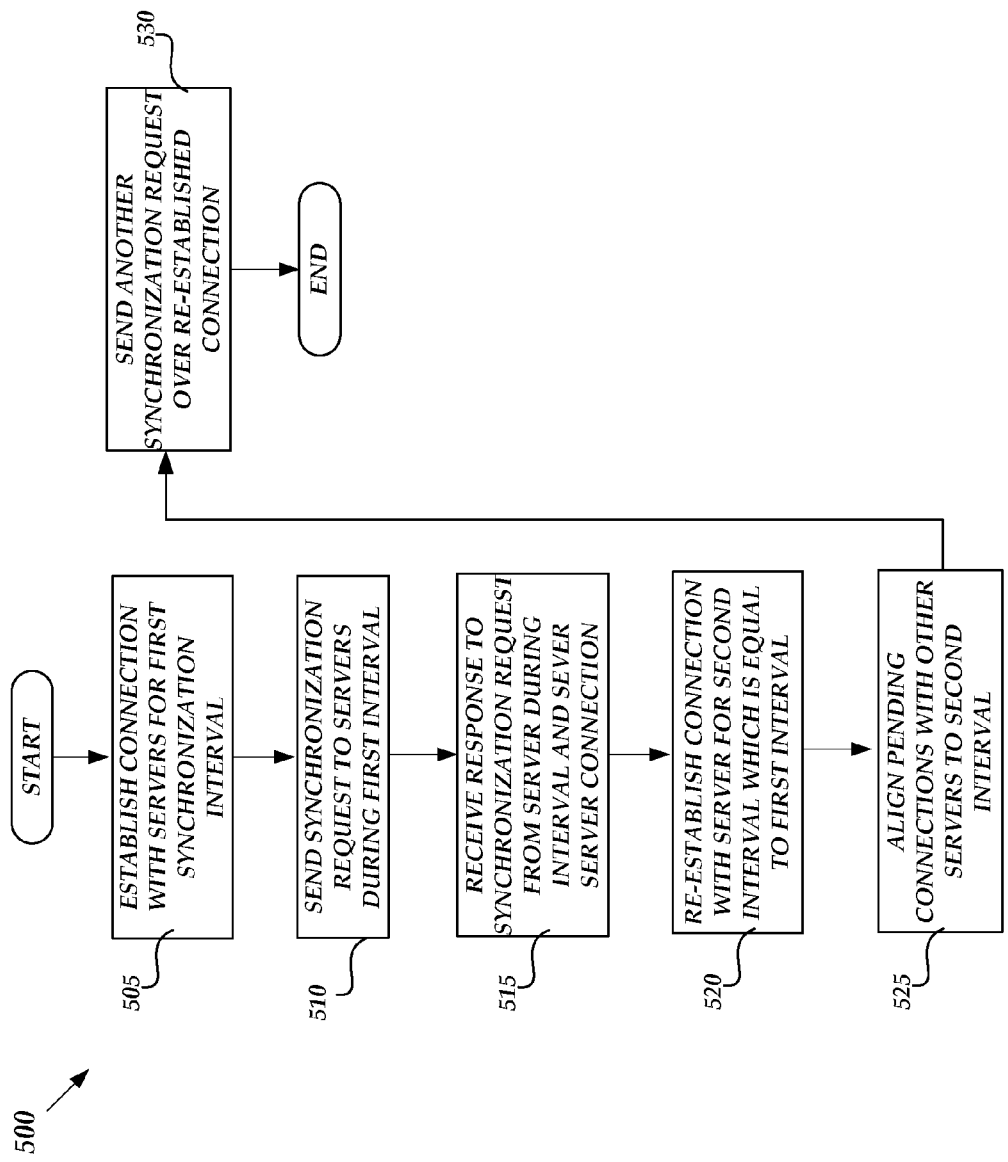
FIG. 5 is a flow diagram illustrating a routine for synchronizing data retrieval with a plurality of data sources on a mobile computing device, in accordance with another embodiment.

FIG. 5 is a flow diagram illustrating a routine 500 for synchronizing data retrieval with a plurality of data sources on a mobile computing device, in accordance with another embodiment. The routine 500 begins at operation 505, where the synchronization application executing on the client mobile computing device 2 establishes a connection with each of the servers 70A-70N for a first synchronization interval. In particular, the synchronization application may establish the aforementioned connections based on user-defined intervals for retrieving data from the servers 70A-70N.

From operation 505, the routine 500 continues to operation 510, where the synchronization application sends a synchronization request to the servers 70A-70N during the first interval. For example, the synchronization request may include a request for e-mail messages from multiple accounts being served by the servers 70A-70N.

From operation 510, the routine 500 continues to operation 515, wherein the synchronization application receives a response to the synchronization request from one of the servers 70A-70N during the first interval and then severs the connection with that server. For example, the synchronization application may receive e-mail messages from an account being served by the server 70A while the connections to the servers 70B-70N remain pending. It should be understood that if no responses are received from any of the pending connections with the servers 70A-70N during the first interval, then the synchronization application may sever the connections and reissue new requests over re-established connections for another synchronization interval.

From operation 515, the routine 500 continues to operation 520 where the synchronization application re-establishes the connection with the server from which a response was first received during the first synchronization interval. The new connection is re-established for a new or second synchronization interval which may be equal in duration to the first interval. For example, if the synchronization application receives a response from the server 70A at the nineteen minute mark and the first synchronization interval is twenty minutes, then the new connection with the server 70A may be re-established for twenty minutes (i.e., the maximum duration of the first synchronization interval).

From operation 520, the routine 500 continues to operation 525 where the synchronization application aligns the pending connections with the other servers to the second synchronization interval. In particular, any time remaining in the first interval associated with the pending connections on other services is extended to coincide with the end of the second synchronization interval.

From operation 525, the routine 500 continues to operation 530 where the synchronization application sends another synchronization request over the re-established connection. It should be understood that according to this embodiment, connections to the servers 70A-70N may be re-established at (or nearly at) the same time, thus conserving resources (i.e., the power required to cause the radio on the client mobile computing device 2 to send multiple requests to multiple servers at different times). From operation 530, the routine 500 then ends.

It should be understood that the routines discussed above in FIGS. 3-5 may be implemented by the synchronization application based on the QoS parameters 60, the history data 62, and/or other time-based probabilities associated with response (content) being returned on pending connections to the servers 70A-70N during a synchronization interval. For example, if a pending connection to the server 70A ends one minute before the other connections and the QoS parameters 60 define a QoS of more than one minute, then the synchronization application may select and execute the routine 400 of FIG. 4 over the routines 300 and 500 of FIGS. 3 and 5, respectively. As another example, if, based on the history data 62 and other time-based probabilities, a response is received over a pending connection to the server 70A when there is not an expectation of data being returned over any pending server connection then the synchronization application may select and execute the routine 300 of FIG. 3. On the other hand, if, based on the history data 62 and other time-based probabilities, a response is received over a pending connection to the server 70A when there is an expectation of data being returned over other pending server connections then the synchronization application may select and execute the routine 500 of FIG. 5.

Figure 6:
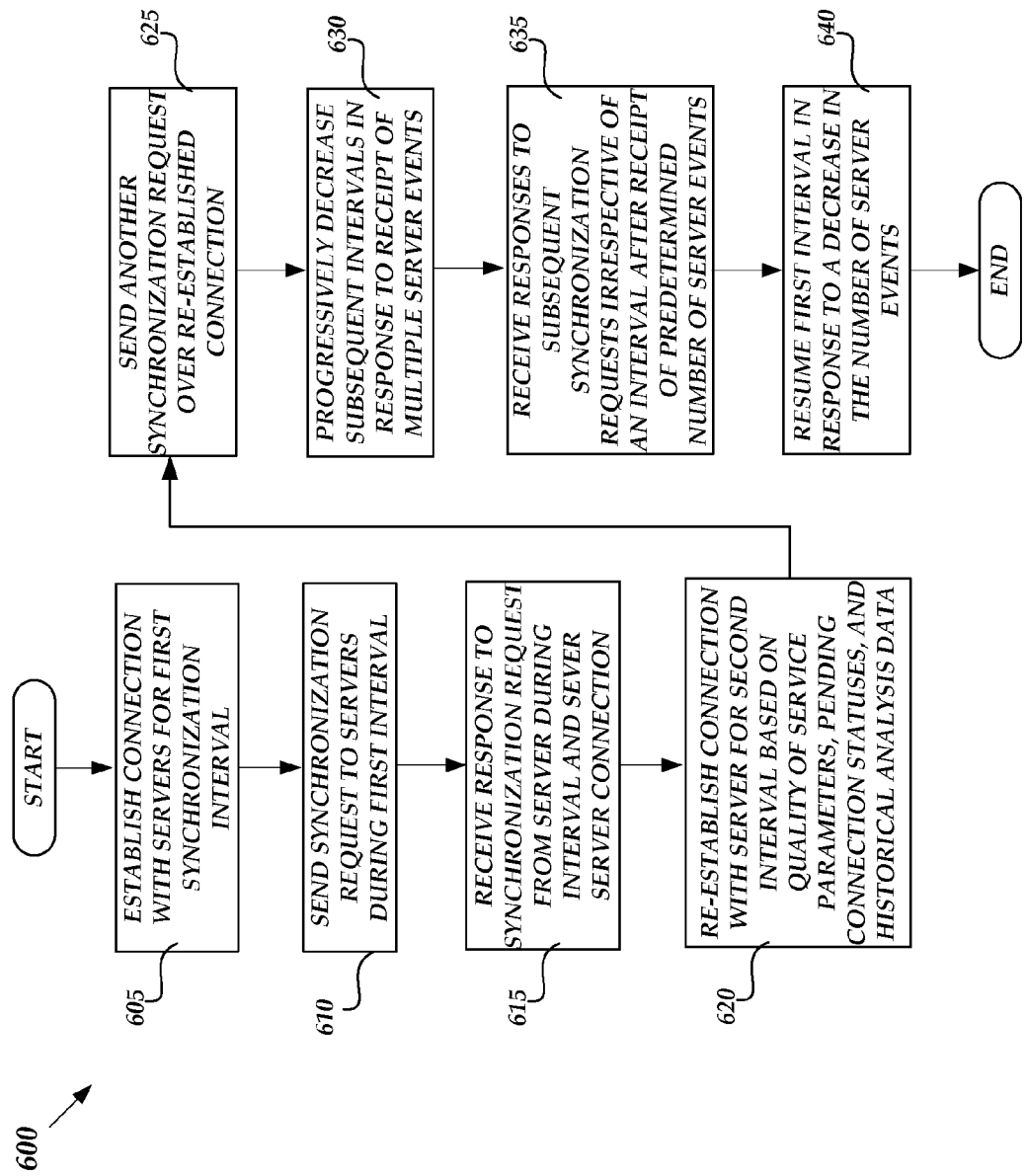
FIG. 6 is a flow diagram illustrating a routine for synchronizing data retrieval with a plurality of data sources on a mobile computing device, in accordance with another embodiment.

FIG. 6 is a flow diagram illustrating a routine 600 for synchronizing data retrieval with a plurality of data sources on a mobile computing device, in accordance with another embodiment. The routine 600 begins at operation 605, where the synchronization application executing on the client mobile computing device 2 establishes a connection with each of the servers 70A-70N for a first synchronization interval. In particular, the synchronization application may establish the aforementioned connections based on user-defined intervals for retrieving data from the servers 70A-70N.

From operation 605, the routine 600 continues to operation 610, where the synchronization application sends a synchronization request to the servers 70A-70N during the first interval. For example, the synchronization request may include a request for e-mail messages from multiple accounts being served by the servers 70A-70N.

From operation 610, the routine 600 continues to operation 615, wherein the synchronization application receives a response to the synchronization request from one of the servers 70A-70N during the first interval and then severs the connection with that server. For example, the synchronization application may receive e-mail messages from an account being served by the server 70A while the connections to the servers 70B-70N remain pending. It should be understood that if no responses are received from any of the pending connections with the servers 70A-70N during the first interval, then the synchronization application may sever the connections and reissue new requests over re-established connections for another synchronization interval.

From operation 615, the routine 600 continues to operation 620 where the synchronization application re-establishes the connection with the server from which a response was first received during the first synchronization interval. The new connection is re-established for a new or second synchronization interval which may be based on the QoS parameters 60, pending connection statuses, and historical analysis data (i.e., the history data 62). In particular, the synchronization application may select and execute one of the routines 300, 400, or 500 (discussed above with respect to FIGS. 3-5) at operation 615.

From operation 620, the routine 600 continues to operation 625 where the synchronization application sends another synchronization request over the re-established connection. It should be understood that according to this embodiment, connections to the servers 70A-70N may be re-established at (or nearly at) the same time, thus conserving resources (i.e., the power required to cause the radio on the client mobile computing device 2 to send multiple requests to multiple servers at different times).

From operation 625, the routine 600 continues to operation 630 where the synchronization application progressively decreases subsequent intervals in response to the receipt of multiple server events (i.e., responses to synchronization requests). For example, in response to multiple connections being established and severed with the server 70A within the duration of a twenty minute synchronization interval associated with pending connections with the servers 70B-70N, the synchronization application may decrease the duration of each subsequent synchronization interval associated with the server 70A (while maintaining the duration of the synchronization intervals with the other servers 70B-70N).

From operation 630, the routine 600 continues to operation 635 where the synchronization application begins receiving responses to subsequent synchronization requests irrespective of a synchronization interval after receiving a predetermined number of server events within the maximum duration of a synchronization interval (e.g., twenty minutes). In particular, the synchronization application may cancel pending synchronization intervals for one or more of the servers 70A-70N in response to receiving a barrage of responses from multiple servers. It should be understood that, in accordance with various embodiments, the synchronization application may transition from making hanging data requests (i.e., "hanging sync") to making to scheduled data requests (i.e., "scheduled sync"). Scheduled data requests are described in greater detail in U.S. Pat. No. 7,269,433 entitled "Scheduling of Synchronization Operation on a Mobile Device Based on Predetermined Subset of User Actions," the disclosure of which is incorporated herein, in its entirety, by reference.

From operation 635, the routine 600 continues to operation 640 where the synchronization application resumes a first synchronization interval for connections established with the servers 70A-70N in response to a decrease in the number of server events being received at one or more of the servers 70A-70N. In particular, the synchronization application may transition back to making hanging data requests from scheduled data requests in response to reduced data traffic thereby conserving resources on the client mobile computing device 2. For example, the synchronization application may transition back to making hanging data requests as soon as a barrage of responses from multiple servers has ended and the frequency of server events being received at one or more of the servers 70A-70N has fallen beneath a threshold. From operation 640, the routine 600 then ends.

Figure 7:
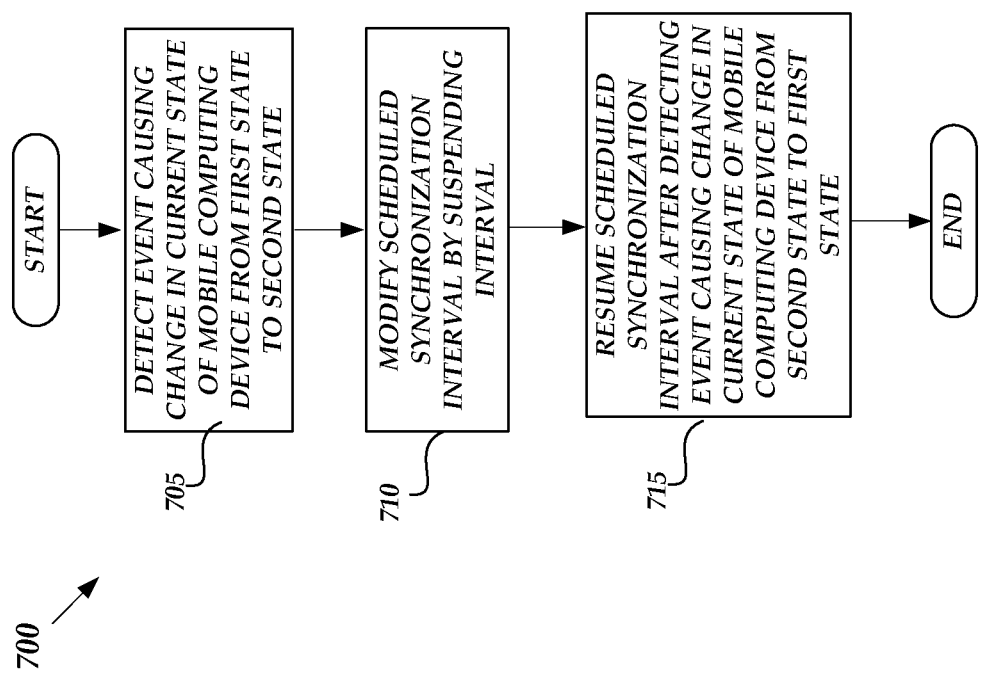
FIG. 7 is a flow diagram illustrating a routine for synchronizing data retrieval with a plurality of data sources on a mobile computing device, in accordance with another embodiment.

FIG. 7 is a flow diagram illustrating a routine 700 for synchronizing data retrieval with a plurality of data sources on a mobile computing device, in accordance with another embodiment. The routine 700 begins at operation 705, where the synchronization application detects an event causing a change in a current state of the client mobile computing device 2 from a first state to a second state. In particular, the synchronization application may be configured to receive data from the environmental sensors 87 indicating a change in the amount of ambient light being received by the client mobile computing device 2 or a change in motion of the client mobile computing device 2. In accordance with various embodiments, events causing change in a current state of the client mobile computing device 2 may also be based on a time of day (as measured by the real time clock in the client mobile computing device 2), a calendar (e.g., by using a calendar application provided within the synchronization application), and the current status of the power supply in the client mobile computing device 2.

From operation 705, the routine 700 continues to operation 710, where the synchronization application modifies a synchronization interval with the servers 70A-70N by suspending the synchronization interval in response to detecting the change in the current state of the client mobile computing device 2 at operation 705. For example, if a user of the client mobile computing device 2 is asleep, the environmental sensors 87 may detect a reduction in the quantity of light being received and/or the absence of motion associated with the client mobile computing device 2, thereby suggesting that the client mobile computing device 2 is not currently being used. As a result, the synchronization application may suspend hanging synchronization requests with the servers 70A-70N to conserve resources on the client mobile computing device 2.

From operation 710, the routine 700 continues to operation 715, where the synchronization application resumes a synchronization interval with the servers 70A-70N after detecting one or more events causing a change in a current state of the client mobile computing device 2 from the second state to the first state. For example, the synchronization application may resume hanging synchronization requests with the servers 70A-70N upon the environmental sensors 87 detecting an increase in the quantity of light being received by the client computing mobile device 2 and/or by detecting motion, thereby suggesting that the client mobile computing device 2 is once again being used. From operation 715, the routine 700 then ends.

FIG. 8 is a flow diagram illustrating a routine 800 for synchronizing data retrieval with a plurality of data sources on a mobile computing device, in accordance with another embodiment. The routine 800 begins at operation 805, where the synchronization application detects an event causing a change in a current state of the client mobile computing device 2 from a first state to a second state. In particular, the synchronization application may be configured to receive data from the environmental sensors 87 indicating a change in the amount of ambient light being received by the client mobile computing device 2 or a change in motion of the client mobile computing device 2. In accordance with various embodiments, events causing change in a current state of the client mobile computing device 2 may also be based on a time of day (as measured by the real time clock in the client mobile computing device 2), a calendar (e.g., by using a calendar application provided within the synchronization application), and the current status of the power supply in the client mobile computing device 2.

From operation 805, the routine 800 continues to operation 810, where the synchronization application progressively increases the duration of a scheduled synchronization interval with the servers 70A-70N by suspending the synchronization interval in response to detecting the change in the current state of the client mobile computing device 2 at operation 805. For example, if the synchronization application determines that the client mobile computing device 2 has not been used for a twenty minutes, then the scheduled synchronization interval with the servers 70A-70N may be progressively increased thirty minutes, forty minutes, and fifty minutes to conserve device resources.

From operation 810, the routine 800 continues to operation 815, where the synchronization application suspends the synchronization interval in response to not detecting an event causing a change in the current state of the client mobile computing device 2 within a predetermined period. For example, if the synchronization application determines that the client mobile computing device 2 has not been used for an hour, then the synchronization application may suspend further synchronization requests with the servers 70A-70N to conserve resources on the client mobile computing device 2.

From operation 815, the routine 800 continues to operation 820, where the synchronization application resumes a synchronization interval with the servers 70A-70N after detecting one or more events causing a change in a current state of the client mobile computing device 2 from the second state to the first state. For example, the synchronization application may resume synchronization requests with the servers 70A-70N upon the environmental sensors 87 detecting an increase in the quantity of light being received by the client computing mobile device 2 and/or by detecting motion, thereby suggesting that the client mobile computing device 2 is once again being used. From operation 820, the routine 800 then ends.

It should be understood, that in accordance with various embodiments, the routines 300-600 discussed above may be repeated (as needed) for subsequent connections and subsequent synchronization intervals between the mobile computing device 2 and the servers 70A-70N. Similarly, the routines 700-800 may be repeated (as needed) for subsequent events causing a change in a current state of the client mobile computing device 2. Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of synchronizing data retrieval with a plurality of data sources on a mobile computing device, comprising:
    establishing, by the mobile computing device, a connection with each of the plurality of data sources for a first synchronization interval;
    upon establishing the connection with each of the plurality of data sources, sending a synchronization request over the connection during the first synchronization interval;
    receiving a response comprising data to the synchronization request from one of the plurality of data sources during the first synchronization interval to synchronize the data, wherein the connection to the one of the plurality of data sources is severed after the data is received;
    re-establishing the severed connection with the one of the plurality of data sources for a second synchronization interval based on quality of service parameters associated with the one of the plurality of data sources and a pending connection status associated with at least one other data source in the plurality of data sources, the re-establishment of the severed connection with the one of the plurality of data sources for a second synchronization interval comprising:
    determining that a pending connection to the one of the plurality of data sources ends a predetermined period prior to pending connections to the at least one other data source in the plurality of data sources;
    determining that the quality of service parameters define a quality of service having a duration which is greater than the predetermined period;
    waiting for an amount of time remaining in a synchronization interval associated with the at least one other data source in the plurality of data sources; and
    re-establishing the severed connection with the one of the plurality of data sources for another synchronization interval which is equal to the first synchronization interval; and
sending another synchronization request over the re-established severed connection.

2. The method of claim 1 further comprising re-establishing the severed connection with the one of the plurality of data sources for a second synchronization interval based on an historical analysis of when data is received over the at least one other data source in the plurality of data sources.

3. The method of claim 2, wherein re-establishing the severed connection with the one of the plurality of data sources for a second synchronization interval based on an historical analysis of when data is received over the at least one other data source in the plurality of data sources comprises:
    determining that a response is received over the pending connection to the at least one data source in the plurality of data sources when, based on the historical analysis, there is not an expectation of data being returned over pending connections to any of the plurality of data sources; and
    re-establishing the severed connection with the one of the plurality of data sources for an amount of time remaining in the first synchronization interval, the first synchronization interval being associated with the pending connection to the remaining data sources in the plurality of data sources.

4. The method of claim 2, wherein re-establishing the severed connection with the one of the plurality of data sources for a second synchronization interval based on an historical analysis of when data is received over the at least one other data source in the plurality of data sources comprises:
    determining that a response is received over the pending connection to the at least one data source in the plurality of data sources when, based on the historical analysis, there is an expectation of data being returned over other pending connections to the plurality of data sources;
    re-establishing the severed connection with the one of the plurality of data sources for another synchronization interval which is equal to the first synchronization interval; and aligning a pending connection with the at least one other data source in the plurality of data sources to the another synchronization interval.

5. The method of claim 1, further comprising:
progressively decreasing subsequent synchronization intervals for receiving responses to synchronization requests in response to the receipt of a plurality of events at the one of the plurality of data sources during a synchronization interval associated with the at least one other data source in the plurality of data sources; upon receipt of a predetermined number of the plurality of events at the one of the plurality of data sources during the synchronization interval associated with the at least one other data source in the plurality of data sources, receiving responses to events received at the one of the plurality of data sources irrespective of a synchronization interval; and
resuming the first synchronization interval for receiving responses to the synchronization requests in response to a decrease in the number of the plurality of events at the one of the plurality of data sources.

6. The method of claim 1, wherein establishing, by the mobile computing device, a connection with each of the plurality of data sources for a first synchronization interval comprises establishing a connection between the mobile computing device and each of a plurality of server computers.

7. The method of claim 1, wherein establishing, by the mobile computing device, a connection with each of the plurality of data sources for a first synchronization interval comprises establishing a connection with each of the plurality of data sources for a predetermined synchronization interval established by the mobile computing device.

8. A computer-readable storage device comprising computer executable instructions which, when executed by a mobile computing device, will cause the mobile computing device to perform a method of synchronizing data retrieval with a plurality of server computers on the mobile computing device, comprising:
    establishing, by the mobile computing device, a connection with each of the plurality of server computers for a first synchronization interval, wherein the first synchronization interval is a predetermined synchronization interval established by the mobile computing device;
    upon establishing the connection with each of the plurality of server computers, sending a synchronization request over the connection during the first synchronization interval;
    receiving a response comprising data to the synchronization request from one of the plurality of server computers during the first synchronization interval to synchronize the data, wherein the connection to the one of the plurality of server computers is severed after the data is received;
    re-establishing the severed connection with the one of the plurality of server computers for a second synchronization interval based on quality of service parameters associated with the one of the plurality of server computers, a pending connection status associated with at least one other server computer in the plurality of server computers, and an historical analysis of when data is received over the at least one other server computer in the plurality of server computers, the re-establishment of the connection with the one of the plurality of server computers for a second synchronization interval comprising:
        determining that a pending connection to the one of the plurality of server computers ends a predetermined period prior to pending connections to the at least one other server computer in the plurality of server computers;
        determining that the quality of service parameters define a quality of service having a duration which is greater than the predetermined period; waiting for an amount of time remaining in a synchronization interval associated with the at least one other server computer in the plurality of server computers; and re-establishing the severed connection with the one of the plurality of server computers for another synchronization interval which is equal to the first synchronization interval; and sending another synchronization request over the re-established severed connection.

9. The computer-readable storage device of claim 8, wherein re-establishing the severed connection with the one of the plurality of server computers for a second synchronization interval comprises:

determining that a response is received over the pending connection to the one of the plurality of server computers when, based on the historical analysis, there is not an expectation of data being returned over pending connections to any of the plurality of server computers; and re-establishing the severed connection with the one of the plurality of server computers for an amount of time remaining in a synchronization interval associated with the at least one other server computer in the plurality of server computers.

10. The computer-readable storage device of claim 8, wherein re-establishing the severed connection with the one of the plurality of server computers for a second synchronization interval comprises:

determining that a response is received over the pending connection to the one of the plurality of server computers when, based on the historical analysis, there is an expectation of data being returned over other pending connections to the plurality of server computers;

re-establishing the severed connection with the one of the plurality of server computers for another synchronization interval which is equal to the first synchronization interval; and aligning a pending connection with the at least one other server computer in the plurality of server computers to the another synchronization interval.

11. The computer-readable storage device of claim 8, further comprising: progressively decreasing subsequent synchronization intervals for receiving responses to synchronization requests in response to the receipt of a plurality of events at the one of the plurality of server computers during a synchronization interval associated with the at least one other server computer in the plurality of server computers; upon receipt of a predetermined number of the plurality of events at the one of the plurality of server computers during the synchronization interval associated with the at least one other server computer in the plurality of server computers, receiving responses to events received at the one of the plurality of server computers irrespective of a synchronization interval; and resuming the first synchronization interval for receiving responses to the synchronization requests in response to a decrease in the number of the plurality of events at the one of the plurality of server computers.

12. A mobile computing device for synchronizing data retrieval with a plurality of server computers, comprising:

a memory for storing executable program code; and a processor, functionally coupled to the memory, the processor being responsive to computer-executable instructions contained in the program code and operative to:

establish a connection with each of the plurality of data sources for a first synchronization interval;

upon the establishment of the connection with each of the plurality of data sources, send a synchronization request over the connection during the first synchronization interval;

receive a response comprising data to the synchronization request from one of the plurality of data sources during the first synchronization interval to synchronize the data, wherein the connection to the one of the plurality of data sources is severed after the data is received;

re-establish the severed connection with the one of the plurality of data sources for a second synchronization interval based on quality of service parameters associated with the one of the plurality of data sources and a pending connection status associated with at least one other data source in the plurality of data sources, the processor, in re-establishing of the severed connection with the one of the plurality of data sources for a second synchronization interval, being further operative to:

determine that a pending connection to the one of the plurality of data sources ends a predetermined period prior to pending connections to the at least one other data source in the plurality of data sources;

determine that the quality of service parameters define a quality of service having a duration which is greater than the predetermined period; wait for an amount of time remaining in a synchronization interval associated with the at least one other data source in the plurality of data sources; and re-establish the severed connection with the one of the plurality of data sources for another synchronization interval which is equal to the first synchronization interval; and send another synchronization request over the re-established severed connection.

13. The mobile computing device of claim 12, wherein the processor is further operative to re-establish the severed connection with the one of the plurality of data sources for a second synchronization interval based on an historical analysis of when data is received over the at least one other data source in the plurality of data sources.

14. The mobile computing device of claim 13, wherein the processor, in re-establishing the severed connection with the one of the plurality of data sources for a second synchronization interval based on an historical analysis of when data is received over the at least one other data source in the plurality of data sources, is operative to: determine that a response is received over the pending connection to the at least one data source in the plurality of data sources when, based on the historical analysis, there is not an expectation of data being returned over pending connections to any of the plurality of data sources; and re-establish the severed connection with the one of the plurality of data sources for an amount of time remaining in the first synchronization interval, the first synchronization interval being associated with the pending connection to the remaining data sources in the plurality of data sources.

15. The mobile computing device of claim 13, wherein the processor, in re-establishing the severed connection with the one of the plurality of data sources for a second synchronization interval based on an historical analysis of when data is received over the at least one other data source in the plurality of data sources, is further operative to: determine that a response is received over the pending connection to the at least one data source in the plurality of data sources when, based on the historical analysis, there is an expectation of data being returned over other pending connections to the plurality of data sources; re-establish the severed connection with the one of the plurality of data sources for another synchronization interval which is equal to the first synchronization interval; and align a pending connection with the at least one other data source in the plurality of data sources to the another synchronization interval.

16. The mobile computing device of claim 12, wherein the processor is further operative to:
progressively decrease subsequent synchronization intervals for receiving responses to synchronization requests in response to the receipt of a plurality of events at the one of the plurality of data sources during a synchronization interval associated with the at least one other data source in the plurality of data sources;
upon receipt of a predetermined number of the plurality of events at the one of the plurality of data sources during the synchronization interval associated with the at least one other data source in the plurality of data sources, receive responses to events received at the one of the plurality of data sources irrespective of a synchronization interval; and
resume the first synchronization interval for receiving responses to the synchronization requests in response to a decrease in the number of the plurality of events at the one of the plurality of data sources.

17. The mobile computing device of claim 12, wherein the processor, in establishing a connection with each of the plurality of data sources for a first synchronization interval, is operative to establish a connection between the mobile computing device and each of a plurality of server computers.

18. The mobile computing device of claim 12, wherein the processor, in establishing a connection with each of the plurality of data sources for a first synchronization interval, is operative to establish a connection with each of the plurality of data sources for a predetermined synchronization interval established by the mobile computing device.

* * * * *